United States Patent [19]

Chapman et al.

[11] Patent Number: 4,752,928
[45] Date of Patent: Jun. 21, 1988

[54] TRANSACTION ANALYZER

[75] Inventors: David D. Chapman, Portland; Donald C. Kirkpatrick, Beaverton, both of Oreg.

[73] Assignee: Tektronix, Inc., Beaverton, Oreg.

[21] Appl. No.: 730,418

[22] Filed: May 6, 1985

[51] Int. Cl.[4] .............................................. G06F 11/00
[52] U.S. Cl. ......................................... 371/20; 371/16
[58] Field of Search ........................ 324/73 R, 73 AT; 371/15, 18, 25, 26, 57, 60, 16, 27

[56] References Cited

U.S. PATENT DOCUMENTS

| 3,976,864 | 8/1976 | Gordon et al. | 324/73 R |
|---|---|---|---|
| 4,096,471 | 6/1978 | Agerhall et al. | 371/60 |
| 4,228,496 | 10/1980 | Katzmann et al. | 364/200 |
| 4,471,427 | 9/1984 | Harris | 364/200 |
| 4,480,315 | 10/1984 | Hickling | 324/73 AT |
| 4,500,993 | 2/1985 | Jacobson | 371/16 |
| 4,554,630 | 11/1985 | Sargent et al. | 371/16 |
| 4,593,391 | 6/1986 | Mitzushima et al. | 371/18 |
| 4,603,322 | 7/1986 | Blair | 340/347 DD |
| 4,611,281 | 9/1986 | Suko et al. | 371/16 |
| 4,660,198 | 4/1987 | Lyon | 371/15 |

FOREIGN PATENT DOCUMENTS

| 0074760 | 6/1981 | Japan | 371/60 |
|---|---|---|---|
| 2070779 | 9/1981 | United Kingdom | 324/73 R |

OTHER PUBLICATIONS

"Monitoring the Operation of Tested Unit", by Frankeny et al, IBM Tech. Disc. Bull., vol. 15, #8, 1173, pp. 2465-2466.

Primary Examiner—Reinhard J. Eisenzopf
Assistant Examiner—W. Burns
Attorney, Agent, or Firm—Boulden G. Griffith; Francis I. Gray; John P. Dellett

[57] ABSTRACT

A transaction analyzer, for use in conjunction with a data acquisition system having a probe for accessing binary data, i.e. address and control signals appearing at the terminals of an operating microprocessor, determines the type of processor transaction occurring based on sequences of state changes occurring on a selected set of the control signals so accessed. The transaction analyzer then generates a binary number representing the transaction type which may be acquired by the acquisition system in conjunction with the data accessed by the probe. The transaction analyzer, which uses an asychronous state machine, also generates control signals used by the acquisition system to clock data storage along with a signal to control the direction of flow of data signals between the processor and the acquisition system. The transaction analyzer is programmable such that it may be used with a variety of different types of microprocessors which may be accessed by the probe, even though such microprocessors may generate differing control line state change patterns during processor transactions and even though transaction types may vary from processor to processor.

16 Claims, 3 Drawing Sheets

TRANSACTION ANALYZER

BACKGROUND OF THE INVENTION

The present invention relates in general to logic analyzers and in particular to an apparatus for monitoring the control lines of a computer processor, determining the type of transaction being performed by the processor, and generating appropriate signals for controlling data acquisition by the logic analyzer.

A typical function of a logic analyzer is to monitor the address and data busses and the control lines appearing on the pins of a microprocessor chip and to display on a screen the sequential history of the microprocessor operation including the states of the control lines and of the lines of the address and data busses of the processor. Logic analyzers typically access the address, data and control lines of the processor by means of a probe inserted between the microprocessor and its socket in the system under test. The probe typically comprises a set of probe pins matching the microprocessor pin arrangement and a probe socket into which the microprocessor can be inserted. Internal probe wiring connects the pins of the microprocessor inserted into the probe socket to the appropriate probe pins inserted into the mother board. This allows the address, data and control lines to be brought out to buffers which can transmit the data thereon to the logic analyzer circuits.

The data acquisition portion of a logic analyzer typically stores data regarding each microprocessor transaction (such as a read or write cycle or an interrupt) in a random access acquisition memory, with data representing successive transactions being stored sequentially at successive addresses. Since the states of data and address busses of a microprocessor are only valid for a portion of a transaction cycle, a transaction analyzer must be provided to monitor selected control lines of a microprocessor and to determine when a valid transaction has occurred and to generate a write strobe signal to the acquisition memory to cause it to store the current data on the data, address and control lines of the processor.

In the prior art, most of the data acquisition portion of a logic analyzer, including the probe, the transaction analyzer and other components were specifically designed for use with only one type of microprocessor. A separate data acquisition unit must be provided for each type of microprocessor to be tested because different microprocessors have different pin arrangements, different types of control lines, different types of transactions and different timing requiremts. In copending patent application Ser. No. 801,450 filed Nov. 25, 1985 by Bogardus et al entitled "Retargetable Buffer Probe" a retargetable probe is disclosed wherein the pin and socket portion of the probe may be replaced to accomodate different types of microprocessors. A cross-connect circuit is also replaceable to allow control, data and address lines leading to the rest of the acquisition unit to appear in the same general arrangement regardless of the type of microprocessor being tested. What is needed and would be useful is a transaction analyzer for use with such a probe, which would accomodate a number of different types of microprocessors without a change in hardware.

SUMMARY OF THE INVENTION

According to one aspect of the present invention, a transaction analyzer comprises a logic device capable of recognizing a number of signal state patterns which may appear on a selected set of microprocessor control lines accessed by a logic analyzer probe. On recognition of any one of such signal state patterns as representing a transaction occurring in the microprocessor, the transaction analyzer generates a clocking signal which initiates logic analyzer acquisition of data appearing at the terminals of the microprocessor by an acquisition memory. The transaction analyzer may be programmed to recognize the control line patterns generated by different microprocessors during transactions occurring therein, and therefore may be used with a retargetable probe for accessing the data appearing at the pins of a variety of different microprocessors.

According to another aspect of the invention, the transaction analyzer comprises a state machine including a random access memory and a state register. The selected control lines from the microprocessor and the data stored in the state register control the addressing of the random access memory. The current output state of the machine, including the state of the acquisition control clocking signal, is determined by the contents of the state register which in turn are controlled by the data previously stored in the RAM. The transaction analyzer may therefore be easily programmed by preloading the RAM with appropriate data.

According to still another aspect of the invention, the state machine is of the asychronous type wherein current output data of the RAM is stored in the state register on occurrence of a change in control line state rather than according to a clocking signal from the microprocessor. This allows the transaction analyzer to provide timing interface between the acquisition system and a variety of different microprocessors without a change in timing interface hardware.

In a further aspect of the invention, the transaction analyzer generates a "transaction tag" comprising binary coded data indicating the type of transaction the microprocessor is performing. This transaction tag may be acquired and stored by the logic analyzer in lieu of data obtained directly from the selected control lines thereby allowing the transaction data to be stored more compactly.

In a still further aspect of the invention, the transaction tags thus generated are generally independant of microprocessor type allowing a greater uniformity in the software used to access the data acquired upon different microprocessors.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a block diagram of a data acquisition system for a logic analyzer incorporating the transaction analyzer of the present invention, FIG. 2 is a block diagram of a transaction analyzer according to the present invention, FIG. 3 is a block diagram of the timing circuit of FIG. 2, FIG. 4 is a block diagram of the change detector of FIG. 3, and FIG. 5 is a block diagram of the delay circuit of FIG. 3.

DETAILED DESCRIPTION

Figure 1:
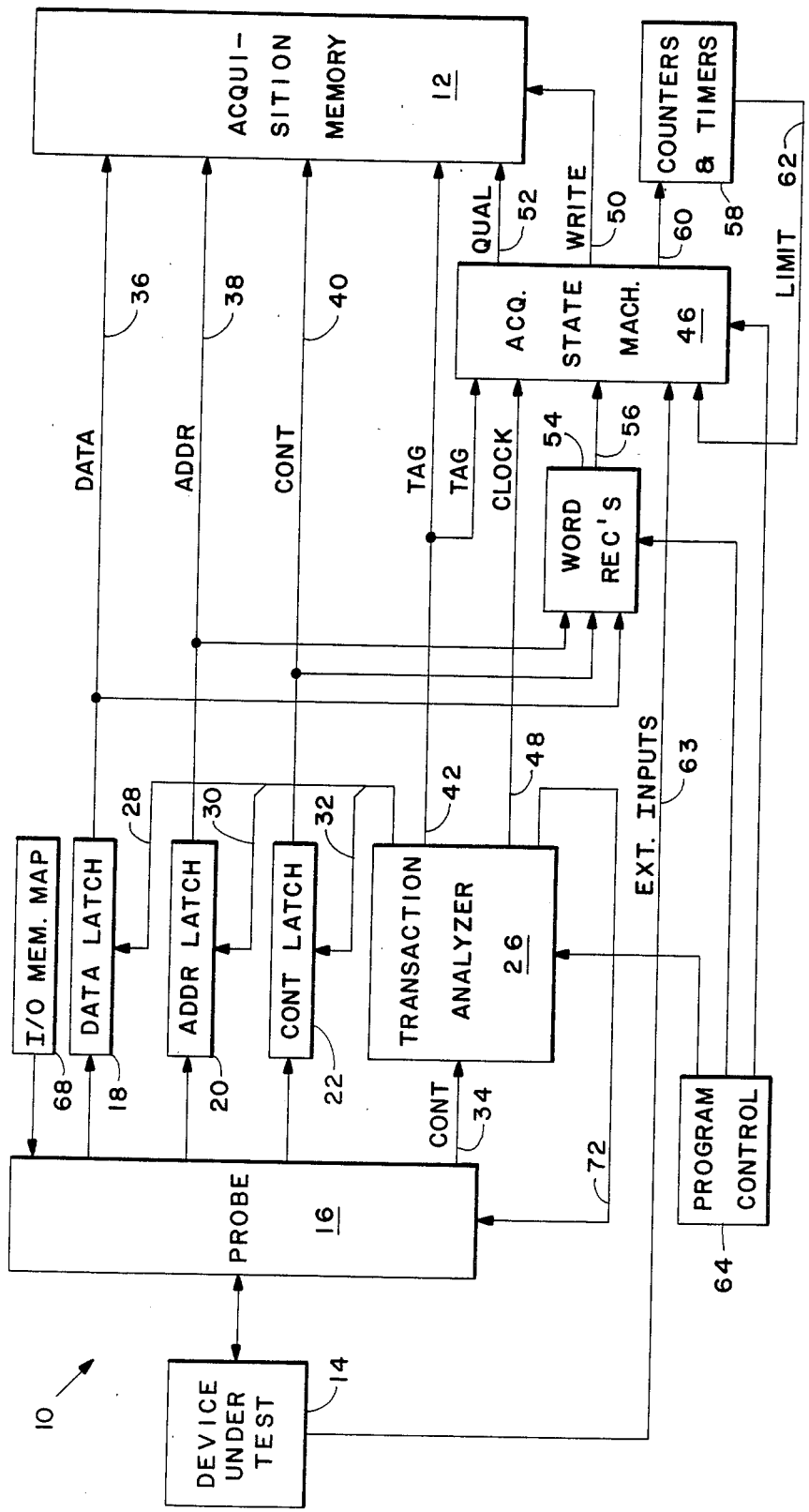

Referring to FIG. 1, a data acquisition system 10, illustrated in block diagram form, is adapted to acquire and store in a random access acquisition memory 12, a sequence of states of data, address and selected control line outputs of a microprocessor operating in device under test 14. System 10 comprises probe 16 which connects the data, address and a selected portion of the control lines appearing on the pins of the microprocessor under test to data, address and control latches 18, 20 and 22, through internal buffers and cross-connect wiring in the probe. Probe 16 also connects other selected control lines appearing at the pins of the microprocessor to the input of transaction analyzer 26 over lines 34. The probe 16 may be "retargeted" for different microprocessors by replacing pins and sockets inserted between the microprocessor and its socket in device 14 and by replacing the cross-connect wiring.

Transaction analyzer 26 controls the storage of the data, address and control information from probe 16 in latches 18, 20 and 22 by generating appropriate latching control signals on control output lines 28, 30 and 32 to the latches at the appropriate times according to the state of the selected control line data on lines 34. The cross-connect wiring in probe 16 is such that the appropriate microprocessor control signals appear on lines 34 whereby transaction analyzer 26 can determine the type and stage of microprocessor transaction occurring. Data stored in latches 18, 20 and 22 are carried on data, address and control line busses 36, 38 and 40 from the latches to the data input terminals of acquisition memory 12.

When transaction analyzer 26 determines from the state of the selected control line data on lines 34 the type of transaction, such as a read or a write operation, being performed by the microprocessor of device 14, it generates on bus 42 a binary coded TAG signal representing the type of transaction. Bus 42 leads to other data input terminals of acquisition memory 12 and to the input of an acquisition state machine 46. The transaction analyzer 26 also generates a CLOCK signal which causes latches 18, 20 and 22 to store new data from probe 16. The CLOCK signal is additionally transmitted to inputs of acquisition state machine 46 over line 48.

Acquisition state machine 46 controls the data storage operation of acquisition memory 12 by transmitting a WRITE signal on line 50 to the write control input of memory 12, causing memory 12 to increment its current address by 1 and to store the data on lines 36, 38, 40 and 42 at the current address. When the current memory address is incremented past its largest possible number, the address is reset to the lowest number and the current data is written into memory over prior stored data at that address.

Acquisition state machine 46 also generates and transmits over line 52 to memory 12 a QUALify bit. Acquisition state machine 46 may be programmed so that it may not generate a WRITE signal every time it receives a CLOCK signal from transaction analyzer 26 such that the sequence of data stored in memory 12 may contain gaps wherein data representing one or more sucessive microprocessor transactions were not stored in memory 12. The QUAL bit is set and stored with the current data on lines 36, 38, 40 and 42 whenever such a gap in data storage has occurred immediately prior to storage of the current data.

Word recognizers 54 may be programmed to transmit indicating signals over lines 56 to acquisition state machine 46 whenever specific patterns of data or address bits appear on lines 36, 38 or 40. The acquisition state machine 46 may be programmed to start or stop generating WRITE signals on receipt of selected indicating signals from word recognizer 54 or on receipt of a selected TAG signal from transaction analyzer 26.

Acquisition state machine 46 may be further programmed to set and initiate the operation of counters and timers 58 using control lines 60. When a counter or a timer reaches a predetermined limit, an appropriate LIMIT signal is transmitted over lines 62 to acquisition state machine 46 which then may use the limit information to start or stop the WRITE signals. For instance, it may be desirable to stop saving data in acquisition memory 12 one hundred microprocessor transactions after a selected address appears on lines 38. In this case, one word recognizer 54 is programmed to recognize the selected address on lines 38 and to generate an indicating signal to state machine 46 when the selected address appears. One counter 58 is programmed to generate a LIMIT signal on line 62 after detecting 100 pulses over line 60. On receipt of the indicating signal, state machine 46 begins transmitting a count pulse over line 60 each time it receives a CLOCK pulse. When it detects the LIMIT signal on line 62, it ceases generation of WRITE signals to memory 12, thereby terminating data storage.

In addition to generating WRITE signals based on selected logical combinations of TAG, CLOCK, LIMIT and word recognizer 54 indicating signals, acquisition state machine 46 may also be programmed to generate WRITE signals according to the state of one or more external inputs on lines 63 from device under test 14. These inputs may carry digital signals representing the condition of various events occurring in device 14 such as, for example, the operation of pushbuttons or relays. This feature permits acquisition system 10 to store data in memory 12 occurring within a selected number of cycles before or after occurrence of an external event.

Data acquisition system 10 may further comprise I/O memory map 68 which may place selected data on the data lines of microprocessor under test when certain selected addresses are accessed during a read operation. Thus I/O memory map 68 may be used to simulute keyboards or other input devices which may not be present in device 14 under test. The data bus from device 14 is applied to a bidirectional buffer in probe 16 such that data may be passed to data latch 18 from the data bus of device 14 through the buffer in probe 16 or data may be passed in the opposite direction through the probe 16 buffer to the data bus of device 14 from I/O memory map 68. The directional sense of the bidirectional buffer in probe 16 is controlled by a signal from transaction analyzer 26 over control line 72 based on the type of microprocessor transaction occurring.

Word recognizers 54, state machine 46 and transaction analyzer 26 may all be programmed prior to initiation of data acquisition through program control device 64 which may comprise a microprocessor system having control, address and data lines coupled to each of the controlled devices.

Transaction analyzer 26 comprises a programmable logic device capable of performing the functions described hereinabove. In the preferred embodiment, transaction analyzer 26 comprises an asynchronous state machine, 80 depicted in block diagram form in FIG. 2. The general operation of this type of asynchronous state machine is disclosed in copending U.S. patent application Ser. No. 730,920 filed May 6, 1985 by Donald C. Kirkpatrick entitled "Asynchronous State Machine", incorporated herein by reference.

Figure 2:
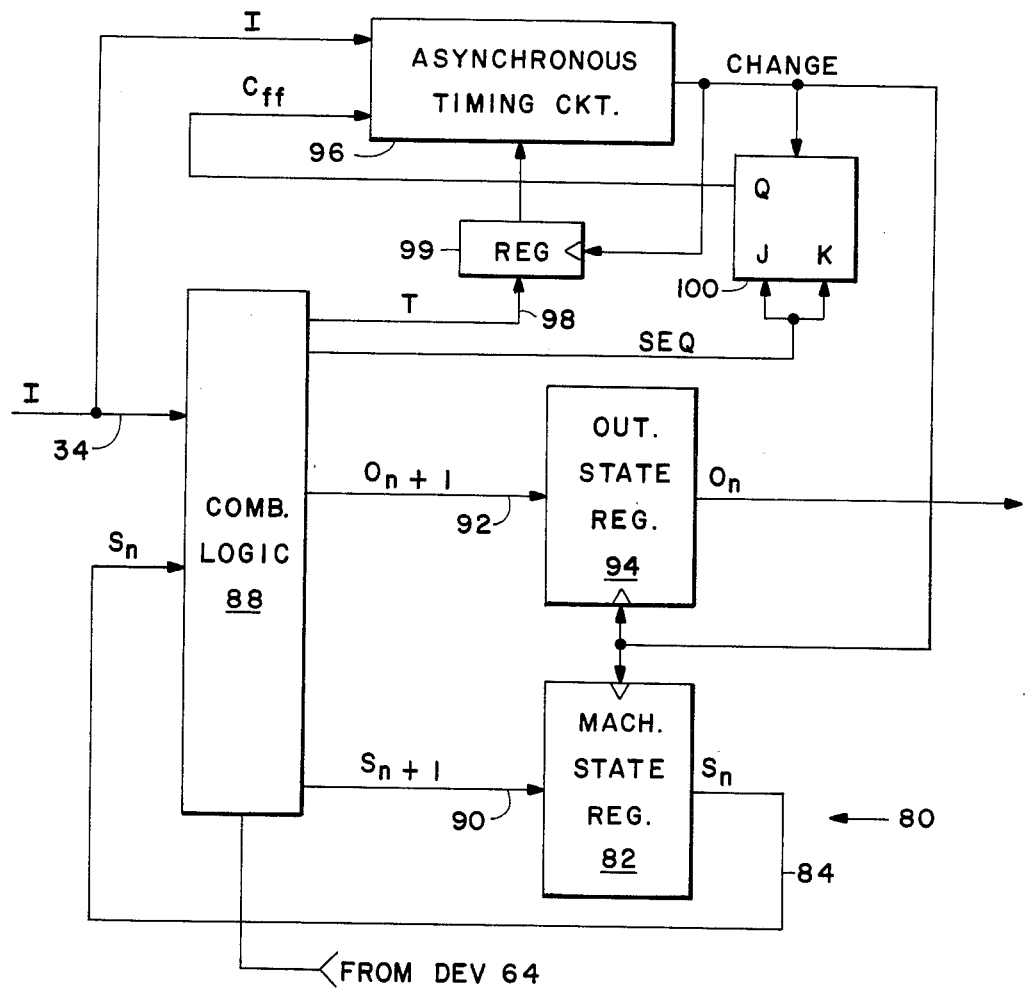

Referring to FIG. 2, the state machine 80, illustrated in block diagram form, is adapted to change to a selected new machine state ($S_{n+1}$) in response to a change in input state (I) during a current machine state ($S_n$), $S_{n+1}$ being therefore a function of both I and $S_n$ or, $$S_{n+1}=f(S_n,I).$$

The current machine state $S_n$ comprises a binary number stored in a machine state register 82 of state machine 80, each bit of $S_n$ representing a binary machine state variable. Each bit of state register 82 appears on a separate line of state register output bus 84. Similarly, input state I also comprises a binary number, each bit thereof representing the state of a separate control line of input bus 34 from probe 16.

Output bus 84 and input bus 34 are both applied as inputs to combinational logic circuit 88. Combinational logic circuit 88 may be and programmable device capable of generating the appropriate $S_{n+1}$ outputs derived from the $S_n$ and I inputs. In the preferred embodiment, however, combinational logic circuit 88 comprises a random access memory (RAM) wherein $S_n$ and I are applied to address the RAM and wherein the $S_{n+1}$ output comprises data stored by the RAM such that when any possible combination of $S_n$ and I addresses the RAM, the appropriate $S_{n+1}$ appears at the data output bus 90 of combinational logic circuit 88.

In addition to machine state variable $S_{n+1}$, combinational logic circuit 88 also generates output variable $O_{n+1}$ according to the function $$O_{n+1}=g(S_n,I)$$

Each $O_{n+1}$ is stored at the same RAM location as the corresponding $S_{n+1}$ and appears on output data bus 92 at the same time $S_{n+1}$ appears on output data bus 90.

Data bus 90 is connected to the input gate terminals of state register 82 such that whenever the clock terminal of state register 82 is strobed by a CHANGE pulse, the contents of data bus 90, $S_{n+1}$, is stored in state register 82 as $S_n$ on the trailing edge of such pulse, thereby advancing the state of state machine 80 by one step. Similarly data bus 92 is connected to the input gate terminals of an output state register 94 such that whenever the clock terminal of register 94 is strobed by the CHANGE pulse, the contents of data bus 92, $O_{n+1}$, is stored in output state register 94 as $O_n$. Each bit stored in state register 94 is placed in a separate output line with output lines arranged and as necessary to form the TAG signal lines clock signal line 48, latch control lines 28, 30 32 or direction control line 72 of FIG. 1.

The CHANGE pulse is generated by asynchronous timing circuit 96. Timing circuit 96 monitors the input state I of state machine 80 appearing on bus 34, applied to the input of timing circuit 96, and generates a CHANGE pulse to advance the state of the machine upon detecting a change in I, after a suitable delay time. The time delay is necessary, in part, to allow combinational logic circuit 88 enough time to generate a new $S_{n+1}$ output in response to a change in I. The access cycle time of logic circuit 88 is designated D2.

The time delay associated with timing circuit 96 is also necessary to ensure that the change in I is complete prior to strobing registers 82 and 94. State machine 80 is a multiple input change state machine wherein several of binary variables of I may change over a time in designated D1, and still be treated as occuring "simultaneously" for purposes of determining the next state of the machine. Consequently, timing circuit 96 must wait for a period of at least t=D1+D2 after detecting the first change in any variable of I before generating the CHANGE pulse to advance the state of the machine.

In the application, the minimum waiting time D1, necessary to ensure that the change in I is complete, may differ depending on the current state $S_n$ of the machine, and different microprocessor transactions may involve varying delay times between the first and last control line change of state. The present invention provides for a timing circuit 96 wherein multiple input change waiting time D1 is variable, rather than fixed, changing with the present state $S_n$. Accordingly combination logic circuit 88 of FIG. 2 generates an additional binary number output variable T on data bus 98 to register 99. The T variable is clocked into register 99 on receipt of a CHANGE pulse from timing circuit 96 and then applied to timing circuit 96. This variable T, a function of $S_n$, is used to alter the time delay t=D1+D2 of timing circuit 96, depending on the current state $S_n$ of the machine. Consequently, any change in $S_n$ forces combinational logic circuit 88 to generate an appropriate change in T whereby the time delay D1 is set to the minimum necessary time for proper operation in the current state, thereby facilitating the fastest possible state advance from each machine state.

State machine 80 is further adapted to permit a sequence of machine state $S_n$ and output state $O_n$ changes following a single input I state change. The sequenced output feature of the asynchronous state machine embodiment 80 of transaction analyzer 26 allows the transaction analyzer to control sequences of operations, as for example, a sequence comprising first the generation of the latch control and TAG signals to cause latches 18, 20 and 22 to store the current probe output, then the termination of the latch control signals, followed by the generation of a CLOCK signal to inform acquisition state machine 46 of the latch operation, and finally the termination of the CLOCK signal.

To permit the sequenced output feature, a single-bit state variable SEQ is generated by logic circuit 88 which is a function of the current state $S_n$. When the sequence variable bit is a logical 1, it indicates that the current state $S_n$ is part of a sequence and that another state in the sequence is to follow without a change in input state I. If the sequence variable is a logical 0, it indicates that the current state $S_n$ is either not a part of a sequence or is the last state in a sequence of states, with no further states to follow until a change in input state I. The sequence variable is then applied to the J and K inputs of J-K flip-flop 100 which is clocked by the CHANGE pulse from timing circuit 96. If the sequence variable is a logical 1, the output of flip-flop 100 will change states on the trailing edge of a CHANGE pulse. If the sequence variable is a logical 0, the output of flip-flop 100 will not change states on receipt of a CHANGE pulse. The output of flip-flop 100, designated $C_{ff}$, is applied as an additional input to timing circuit 96.

When input I changes state, the state change is detected by timing circuit 96 which subsequently generates a CHANGE pulse to advance the state $S_n$ of the machine. If this state is the first of a sequence, the sequence state variable produced by logic circuit 88 will be a logical 1. Therefore, the falling edge of the CHANGE pulse arriving at flip-flop 100 will cause the output of flip-flop 100 to change state. Use of the falling CHANGE pulse edge ensures that state register 82 has stored the new $S_n$ prior to the clocking of flip-flop 100 and ensures that the asychronous timing circuit 96 is ready to accept the output of flip-flop 100. This change of flip-flop output $C_{ff}$ state is detected by timing circuit 96, which issues a subsequent CHANGE pulse thereby initiating a second state advance in the sequence of $S_n$ states. The machine will continue to advance through the state sequence until it reaches the last state $S_n$ in the sequence, wherein the sequence variable is set to a logical 0. When this logical 0 is applied to the J and K inputs of the flip-flop 100, no change of state of flip-flop 100 output occurs on the falling edge of the CHANGE pulse. Therefore, no $C_{ff}$ input change is detected by timing circuit 96 and state machine 80 remains at rest until it detects a change in input state I.

Figure 3:
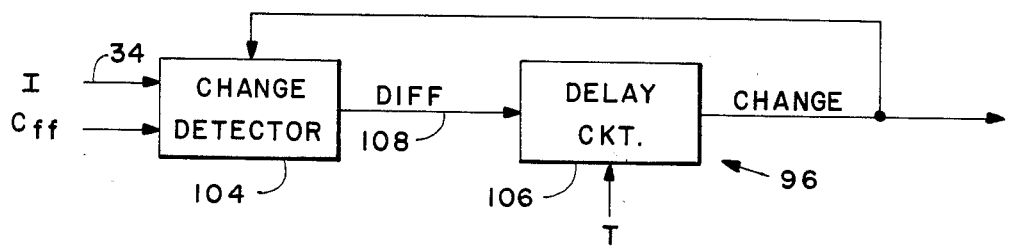

Referring now to FIG. 3, an embodiment of the asychronous timing circuit 96 of FIG. 2, depicted in block diagram form, comprises a change detector circuit 104 and a variable time delay circuit 106. Any change in input state I or in flip-flop 100 output state $C_{ff}$ is detected by change detector circuit 104 which then generates a logical 1 (high) output signal DIFF on line 108 coupled to the input of delay circuit 106. The DIFF signal stays high, regardless of any subsequent changes in I or $C_{ff}$, until change detector circuit 104 receives a high CHANGE signal generated by delay circuit 106. The output of delay circuit 106, the CHANGE signal, switches high a selected delay time after the DIFF input from change detector 104 goes high. As the CHANGE signal goes high, the DIFF output of change detector 104 is reset to logical 0 (low) and stays low until change detector 104 detects a subsequent change in I or $C_{ff}$.

When the DIFF signal returns to 0, the CHANGE signal output of delay circuit 106 immediately goes to 0. Therefore the CHANGE pulse generated by delay circuit 106 is relatively narrow, its width being determined by the resetting time of change detector 104 upon receipt of the leading edge of the CHANGE pulse, and the resetting time of delay circuit 106 on receipt of the trailing edge of the DIFF signal. In the prior art, using a topology similar to that depicted in FIG. 3, the delay circuit 106 delayed both the leading and trailing edges of the DIFF signal by the same, fixed, delay time, thereby extending the response time of the state machine. In the present instance, only the leading edge of the DIFF signal is delayed by the delaying circuit 106, and the trailing edge is not delayed. Further the leading edge delay time is variable, depending on the state of timing input variable T generated and transmitted to delay circuit 106 by combination logic circuit 88 of FIG. 2 as described above.

The delay of the leading edge of the DIFF signal is such that the trailing edge of the CHANGE pulse occurs at a time $$t = D1 + D2 = D3 + D4$$

after the leading edge of the the DIFF signal, where D1 is the input I change waiting time as described above, D2 is the cycle time of combinational logic circuitry 88 also as described above, D3 is the variable delay in delaying circuit 106, and D4 is the fixed pulse width of the CHANGE pulse. With the time D3 appropriately controlled by the time variable T supplied by the logic circuitry 88, D4 being fixed, the time t will be the minimum possible for each machine state $S_n$.

Figure 4:
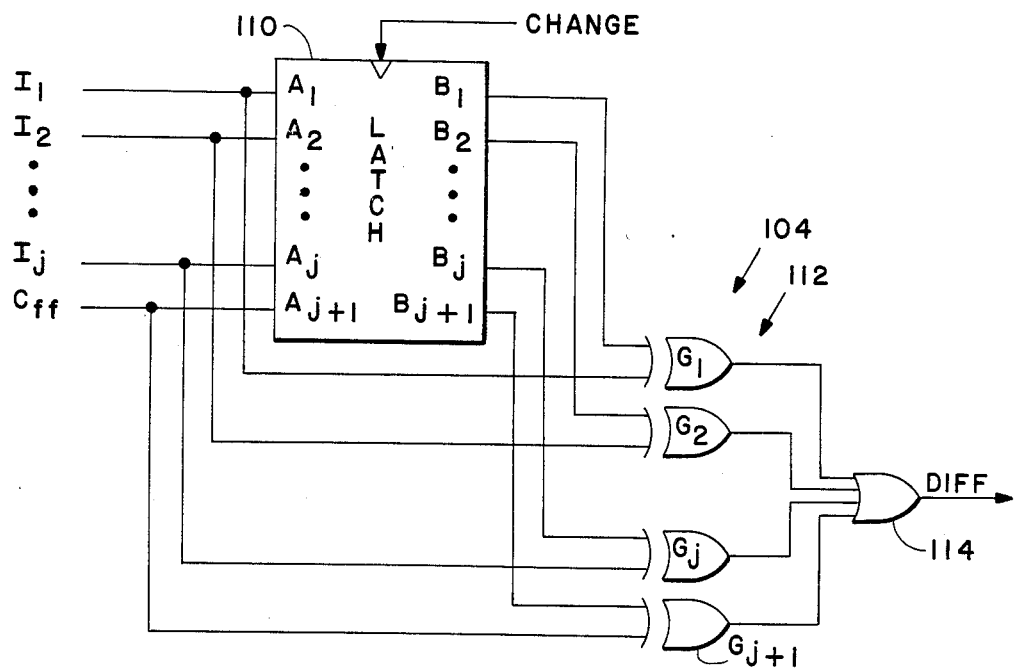

An embodiment of change detector circuit 104, depicted in FIG. 4 in block diagram form, comprises a j+1 bit latch circuit 110, a set of j+1 exclusive OR (XOR) gates 112, designated $G_1$ to $G_{j+1}$, and OR gate 114. The variable j is the number of binary state variables forming input state I. Each input variable $I_x$ is applied to the corresponding input $A_x$ of latch 110 and also to one input of corresponding XOR gate $G_x$. Similarly, the $C_{ff}$ variable from flip-flop 100 of FIG. 2 is applied to the $A_{j+1}$ input of latch 110 and also to one input of XOR gate $G_{j+1}$. Each output $B_x$ of latch 110 is applied to a second input of the corresponding XOR gate $G_x$ and every output of XOR gate 112 is connected to a separate input of OR gate 114. The CHANGE signal from delay circuit 106 controls the clock input of latch 110.

Latch 110 is of the type wherein the inputs are transferred to the outputs when the clock is high, the outputs remaining fixed while the clock terminal is low. Thus when the CHANGE signal goes low the last states of I and $C_{ff}$ are stored in the latch and appear at outputs $B_x$ until the arrival of the leading edge of another CHANGE signal at the clock input. When a change occurs in any $I_x$ or in $C_{ff}$, the inputs of the corresponding XOR gate differ such that the output of the XOR gate switches to a logical 1 causing the output of OR gate 114, the DIFF signal, to go high as well. When the leading edge of the CHANGE signal arrives at the clock input of latch 110, the current states of $I_x$ and $C_{ff}$ are transferred to the outputs of the latch and applied through the $B_x$ output terminals of the latch to the corresponding XOR gate 112 inputs such that both inputs of every XOR gate are equal. This causes the output of every XOR gate to switch to 0, and thereby causes the DIFF output of OR gate 114 also to switch back to 0. Delay circuit 106 then drives the CHANGE signal low, thereby completing an input detection cycle and initiating a machine state change. Thereafter any subsequent change in I or $C_{ff}$ will initiate another detection cycle.

Figure 5:
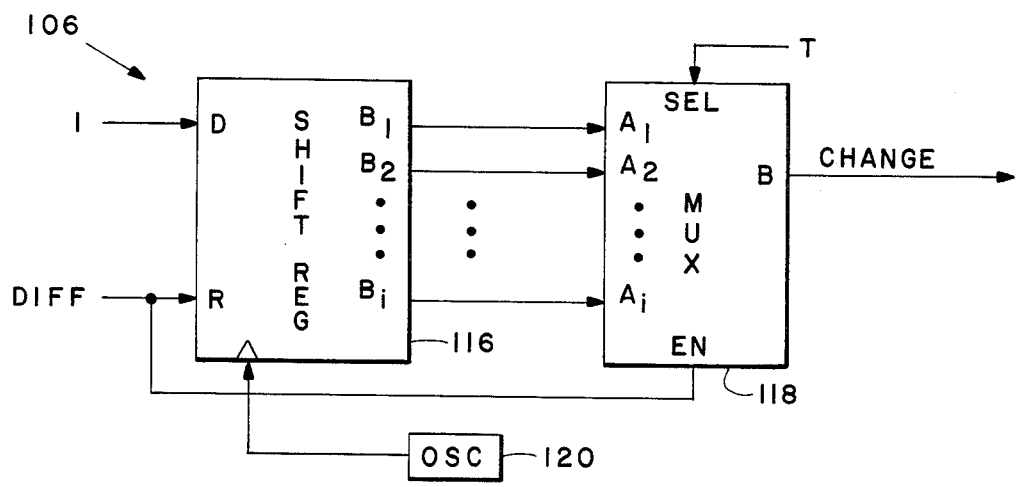

A more detailed embodiment of delay circuit 106 of FIG. 2, shown in block diagram form in FIG. 5, comprises an i-stage shift register 116, a multiplexer circuit 118 having i inputs, and an oscillator 120. The DIFF signal is applied to the reset input (R) of shift register 116 while a logical 1 is applied to the data input (D). Shift register 116 is clocked by oscillator 120. The outputs of shift register 116, designated $B_1$ through $B_i$, are applied to the corresponding inputs $A_1$ through $A_i$ of multiplexer 118. The DIFF signal is also applied to the enable (EN) input of multiplexer 118 while the T variable from logic circuit 88 of FIG. 2 is applied to the switching control inputs of multiplexer 118.

Every output $B_x$ of shift register 118 is reset to 0 on receipt of the leading edge of a DIFF signal. Subsequently, on each clock cycle from oscillator 120, shift register 116 shifts the logical 1 applied to the data input terminal to successive outputs $B_x$ such that $B_1$ goes high on the first clock cycle after reset, $B_2$ goes high on the second clock cycle after reset and $B_x$ goes high on the Xth clock cycle after reset. The output B of multiplexer circuit 118, which comprises the CHANGE signal, is always low when the DIFF signal, applied to the enable input of the multiplxer is low. When the DIFF signal goes high, the output B of the multiplexer circuit 118 reflects one selected input Ax, the selection being controlled by the variable T applied to the selection control inputs.

In the preferred embodiment, oscillator 120 operates at 100 mhz. Therefore successive outputs $B_x$ of shift register 116 go high 10 nsec apart. The variable delay time D3 of delay circuit 106 is set by adjusting the value of T such that multiplexer 118 passes the appropriate $B_x$ output of shift register 116 to the output B of multiplexer 118. If the number of stages i of shift register 116 is 16, then delay time D3 may range 10 to 160 nsec in steps of 10 nsec. The range from and resolution of D3 may be altered by changing the number i of shift register 116 stages and by adjusting the frequency of oscillator 120.

On receipt of the leading edge of a DIFF pulse, every output of shift register 116 is set to 0 and multiplexer 118 is enabled. Successive outputs puts $B_x$ of shift register 116 begin to go high on each cycle of oscillator 120. The CHANGE output of multiplexer 118 goes high after a selected time D3, when the selected Ax input from shift register 116 goes high. The CHANGE output signal then causes the change detector circuit 104 of FIG. 3 to reset the DIFF signal to 0. As the DIFF signal falls to 0, the enable input of multiplexer 118 goes to 0, thereby resetting to 0 the CHANGE output signal of multiplexer 118 to complete the change detection cycle and to initiate a machine state change.

The random access memory of combinational logic circuit 88 of FIG. 2 may be loaded with data such that only those combinations of selected control signals on lines 34 from probe 16 which represent legitimate microprocessor transactions will result in a change in transaction analyzer state wherein a CLOCK signal, an I/O directon control signal, a TAG signal, or a latch control signal changes state. The transaction analyzer 26 is thus programmable in that the RAM of logic circuit 88 may be loaded with different data depending on the type of microprocessor under test. The use of a programmable transaction analyzer 26 therefore is most desirable in conjunction with the use of a retargetable probe 16, as mentioned above capable of being altered such that the selected control signals appear on lines 34 regardless of the type of microprocessor associated with the device 14 under test.

However, the TAG signals generated by transaction analyzer 26 may be standardized for all microprocessors to the extent that they represent the same type of transaction. In addition to permitting acquisition memory 12 to store data regarding the type of transaction in a more compressed form, the TAG signals generated by transaction analyzer 26, when so standardized, allow a higher degree of standardization of software which subsequently makes use of the data stored in memory 12 since there is no need for such software to know the type of microprocessor being tested in order to determine the type of transaction being performed.

Since the transaction analyzer 26 can also generate the I/O direction signal on line 72, such a transaction analyzer permits the use of the I/O memory map 68, described above, to simulate input devices to device 14 when used in conjunction with a probe 16 having bidirectional data buffers.

The use of asynchronous timing in transaction analyzer 26 allows the transaction analyzer to be programmed for use with different microprocessors under test without a change in timing hardware as would be sometimes required when using a transaction analyzer employing a synchronous state machine clocked by clock signals received from the device 14 under test.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A transaction analyzer, for use in conjunction with a data acquisition system accessing a set of digital signals appearing at a plurality of terminals of an electronic device, the electronic device being capable of executing a plurality of types of transactions, comprising:
   an asynchronous state machine generating a control signal to initiate acquisition by the data acquisition system of data transmitted by the set of digital signals during the occurrence of one of the types of transactions, the occurrence and type of transaction being ascertained by monitoring indicative data patterns transmitted by a subset of the set of digital signals, a unique data pattern being associated with each type of transaction, the subset of the set of digital signals being applied as inputs to the state machine and the control signal being generated according to a current output state of the state machine.

2. A transaction analyzer, for use in conjunction with a data acquisition system accessing a set of digital signals appearing at a plurality of terminals of an electronic device under test, the electronic device under test being capable of executing a plurality of types of transactions, comprising:
   a state machine having a current state and a next state, the next state being a function of the current state, a subset of the set of digital signals, and pre-programmed instructions; and
   an output state register having data locations that are addressed by the current state of the state machine, the data locations containing data tages associated by the pre-programmed instructions with the type of transaction, so that the data acquisition system is informed of the type of transaction occurring in the electronic device under test by the associated data tag in a way that is uniform for the data acquisition system.

3. A transaction analyzer as recited in claim 2, wherein the state machine is asynchronous, operating independently of an externally generated synchronizing clocking signal.

4. A transaction analyzer as recited in claim 2, further comprising means for generating a timing signal dependent on the current state of the state machine.

5. A transaction analyzer as recited in claim 2, further comprising means fo generating a bi-directional control signal dependent on the current state of the state machine.

6. A transaction analyzer, for use in conjunction with a data acquisition instrument accessing a set of digital signals from one of a plurality of different microprocessors under test, the microprocessors under test each being capable of executing a plurality of types of transactions, comprising:

a state machine having a current state and a next state, the next state being a function of the current state, a subset of the set of digital signals, and pre-programmed instructions specific to the one of a plurality of microprocessors under test; and an output state register having data locations that are addressed by the current state of the state machine, the data locations containing data tags associated by the pre-programmed instructions with the types of transactions of a particular microprocessor under test, so that the data acquisition instrument is informed of the type of transaction occurring in the particular microprocessor under test by the associated data tag in a way that is uniform for the data acquisition instrument despite differences between the plurality of microprocessors under test.

7. A transaction analyzer as recited in claim 6, wherein the state machine is asynchronous, operating independently of an externally generated synchronizing clocking signal.

8. A transaction analyzer as recited in claim 6, further comprising means for generating a timing signal dependent on the current state of the state machine.

9. A transaction analyzer as recited in claim 6, further comprising means for generating a bi-directional control signal dependent on the current state of the state machine.

10. A transaction analyzer as in claim 1 wherein said asynchronous state machine comprises:

first means to store a current machine state and a current output state, said first control signal being generated according to said current output state, second means to generate a next machine state and a next output state, said next machine and output states being determined by said current machine state and said first signal subset, said first means storing said next machine and output states in place of said current machine and output states in response to an applied state change signal, and third means to generate said state change signal a selected time following a change in state of said first signal subset.

11. A transaction analyzer as in claim 10 further comprising:

fourth means to generate a timing signal, said timing signal varying according to the current machine state, said selected time varying according to said timing signal.

12. A state machine as in claim 10 wherein said second means comprises an addressable memory device, said memory device being currently addressed according to a current state of said first signal subset in combination with said current machine state, and wherein said next machine and next output states are stored in said memory at a selected address.

13. A method for analyzing the transactions occurring in a a microprocessor of a particular type and informing a data acquisition system of the type of transaction occurring at each of a plurality of data acquisition times using a set of descriptions for transaction types that is the same for a variety of microprocessor types, the method comprising the steps of:

pre-programming a specialized state machine with reference information specific to the particular microprocessor from which data is to be acquired, the pre-programmed reference information describing in terms of transaction types the significance of various sequences of combinations of signals from microprocessors of that particular type, monitoring the microprocessor with some of the inputs to the state machine, comparing the activities of the microprocessor with the pre-programmed reference information to determine the transaction type presently occurring in the microprocessor, and outputting data tages to the data acquisition system for association with the data acquired by the data acquisition system so as to classify the current transaction type according to the pre-programmed reference information into one of a set of descriptions of standard transaction types that embrace all of the types of transactions expected within any of the types of microprocessors within the variety of microprocessor types from which data is to be acquired.

14. A method as recited in claim 13, further comprising the step of outputting a timing signal dependent on the transaction type, the microprocessor type, and the pre-programmed reference information.

15. A method as recited in claim 13, further comprising the step of outputting a bi-directional control signal dependent on the transaction type, the microprocessor type, and the pre-programmed reference information.

16. A transaction analyzer for use with a data acquisition system to determine the type of transaction being performed by a processor in a device under test comprising:

means for monitoring a selected subset of a set of control lines from the processor;

means for recognizing from the selected subset a specific transaction type being performed by the processor, said recognizing means being programmable according to the processor in the device under test;

means for controlling acquisition of data from the processor by the data acquisition system according to the specific transaction type; and means for providing to the data acquisition system a tag signal corresponding to the specific transaction type, the tag signal being independent of the processor.

* * * * *